J. B. OFFERMANN.
COMBINATION TOOL.
APPLICATION FILED DEC. 30, 1916.
1,223,722.
Patented Apr. 24, 1917.
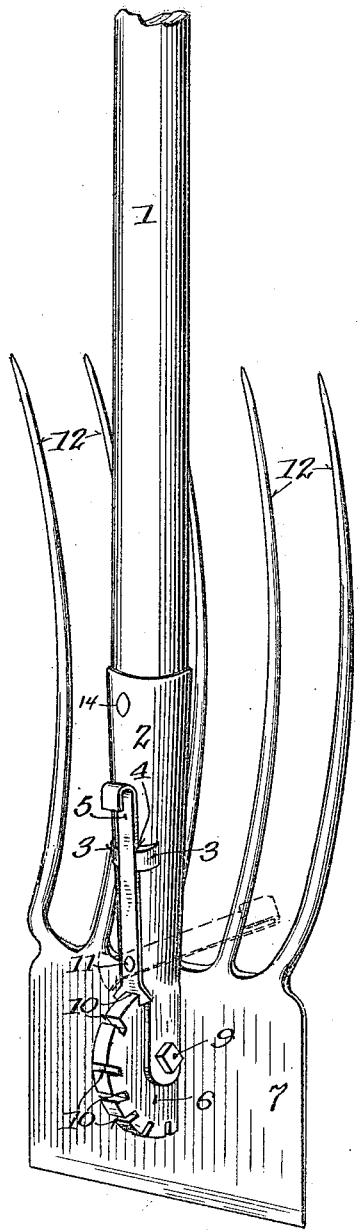
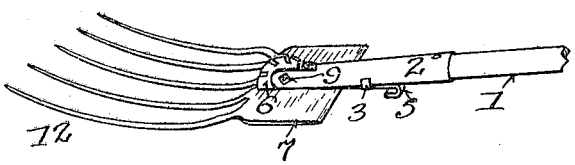
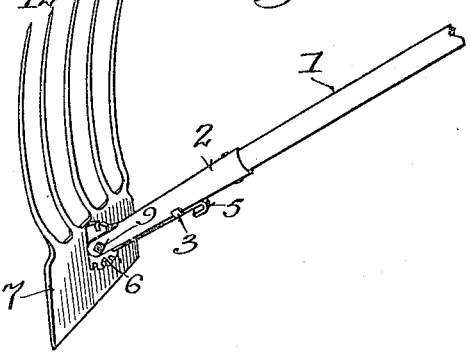
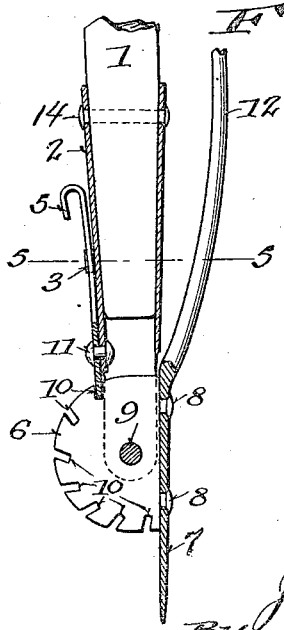
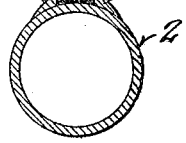

UNITED STATES PATENT OFFICE.

JOHN B. OFFERMANN, OF BEAVER DAM, WISCONSIN.

COMBINATION-TOOL.

1,223,722.  Specification of Letters Patent.  Patented Apr. 24, 1917.

Application filed December 30, 1916. Serial No. 139,739.

*To all whom it may concern:*

Be it known that I, JOHN B. OFFERMANN, a citizen of the United States, residing at the city of Beaver Dam, county of Dodge, and State of Wisconsin, have invented new and useful Improvements in Combination-Tools, of which the following is a specification.

My invention relates to improvements in combined tools.

The object of my invention is to combine a fork with a blade that the same may be adjusted to be used either as a fork, a hoe, a rake, a scraper, or for other purposes, and the same is securely held in place when adjusted as it is thus used for any of the numerous purposes for which it is adapted.

My invention is further explained by reference to the accompanying drawing, in which—

Figures 1, 2 and 3 are perspective views.

Fig. 4 is a vertical section of Fig. 1, the free or outer end of the handle, and Fig. 5 is a transverse section, drawn on line 5, 5 of Fig. 4.

Like parts are identified by the same reference numerals throughout the several views.

1 is the handle, the free or outer end of which has been removed. To the lower end of the handle is attached a ferrule or sleeve 2, which is bifurcated and provided with a pair of lugs 3, 3 between which is a recess 4 formed for the reception of the locking lever 5. 6 is a semi-circular plate which is rigidly secured to the plate 7, by a plurality of bolts 8, or in any convenient manner, and said semi-circular plate 6 is pivotally connected with the lower end of the sleeve 2 by the pivotal bolt 9. The semi-circular plate 6 is provided with a plurality of recesses 10 for the reception of one end of the locking lever 5. The locking lever 5 is pivotally connected with the lower end of the sleeve 2 by the pivotal bolt 9, and the pivotal bolt 9 is located near the lower end of the locking lever 5. 12 are the tines of the fork, which are preferably formed of the ordinary shape and are connected with the plate or blade 7 by welding or in any ordinary manner.

It will be understood that when the device is adjusted with the blade 7 extending downwardly, as shown in Fig. 1, the locking lever 5 is adapted to engage the upper recess 10 formed in said semi-circular plate, as shown in Figs. 1 and 4, whereby the blade is adapted to be used either as a shovel or scraper, or for numerous other purposes.

When desirous to use the tool as a fork the locking lever 5 is thrown to one side, as indicated by dotted lines in Fig. 1, when the tines are thrown downwardly and outwardly, as indicated in Fig. 2, whereby the blade 7 is brought against the sleeve 2, as shown in Fig. 2, when the locking lever is brought back to the vertical, when it is held in place by the lugs 3, 3, as shown in Fig. 1. When, however, the tool is used as a hoe, or rake, it is adjusted, as shown in Fig. 3, when it held in place by the locking lever 5, which engages in one of the recesses 10. The sleeve 2 is secured to the lower end of the handle 1 by one or more bolts 14, as shown in Fig. 4.

Thus, it is obvious that the blade and fork may be adjusted at any point corresponding with the several notches or recesses 10 formed in the semi-circular plate 6, and when so adjusted it is securely retained in place by the fastening lever 5, engaging in any one of the recesses 10.

Having thus described my invention what I claim as new and desire to secure by Letters Patent, is:—

1. In a device of the described class, the combination of a sleeve, a locking lever pivotally connected near one of its ends with said sleeve, a retaining member formed in connection with said sleeve for the reception of one end of said locking lever, a blade, a semi-circular plate rigidly affixed to said blade, said semi-circular plate being provided with a plurality of recesses for the reception of one end of said locking lever, and means for pivotally connecting said semi-circular plate to said sleeve.

2. In a device of the described class, the combination of a locking lever pivotally connected near one of its ends with said sleeve, a pair of annular lugs, forming a recess between said lugs for the reception of one end of said locking lever, a blade, a semi-circular plate rigidly affixed to said blade, said semi-circular plate being provided with a plurality of recesses for the reception of one end of said locking lever, and means for pivotally connecting said semi-circular plate to said sleeve.

In testimony whereof I affix my signature in the presence of two witneses.

JOHN B. OFFERMANN.

Witnesses:
J. L. MILTGEN,
JOHN OFFERMANN.

Copies of this patent may be obtained for five cents each, by addressing the "Commissioner of Patents, Washington, D. C."